Patented Apr. 29, 1947

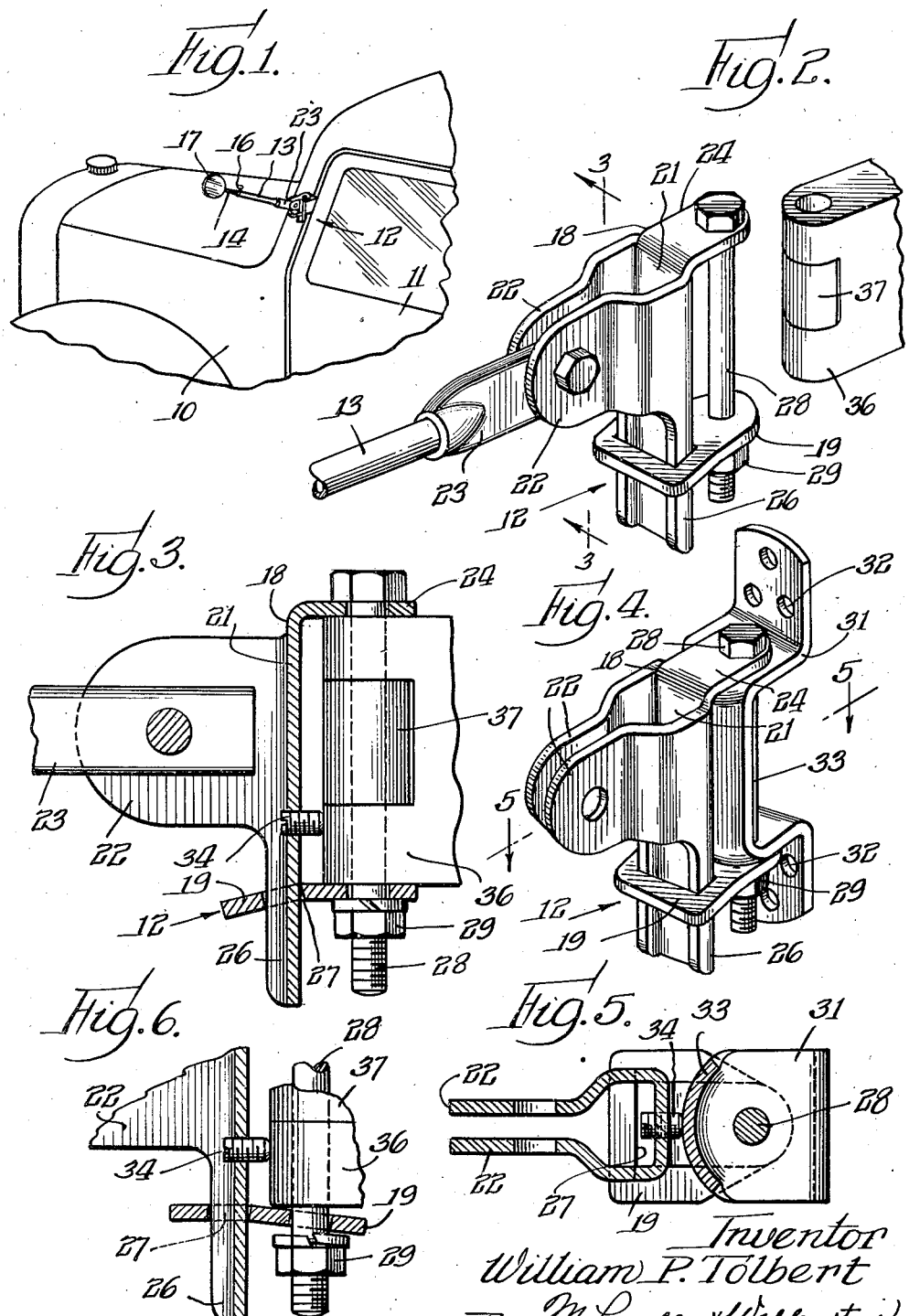

2,419,923

UNITED STATES PATENT OFFICE 2,419,923

ADJUSTABLE BRACKET

William P. Tolbert, Fort Madison, Iowa, assignor to Anthes Force Oiler Company, Fort Madison, Iowa, a corporation of Iowa Application December 28, 1945, Serial No. 637,533

9 Claims. (Cl. 248—226)

My invention relates to adjustable brackets for rear view mirrors.

Commercial vehicles are commonly provided with rear view mirrors projecting a sufficient distance from the cab to permit the driver to observe the area in back of him. These mirrors are supported on adjustable arms carried by adjustable brackets so arranged that they may be mounted on various types of vehicles and adjusted to proper position thereon. The adjustable brackets may be mounted on adapters secured to a suitable place on the body or the bracket may be mounted on a hinge by removing the hinge pin and replacing it with a bolt forming a part of the bracket assembly. To permit this type of operation, the bracket must be adjustable to fit hinges of different lengths, and various constructions have been used for the purpose. In a commonly used arrangement, the bracket comprises two parts in slidable relation, these two parts being complementary to each other, and sometimes substantially identical, and each having a mounting lug to receive the bolt which replaces the hinge pin. Brackets heretofore used for the purpose have been unsatisfactory in several respects, principally in that the weight-to-strength ratio was relatively high and attempts to lighten the bracket resulted in the use of too thin a section to provide for adequate strength.

The principal object of my invention is the provision of an improved support for a rear view mirror.

Another object is the provision of an improved adjustable bracket.

In accordance with the general features of my invention, I provide an adjustable bracket for an adjustable mirror supporting arm. The bracket has two parts, one of which comprises a clamping member to which the adjustable arm is secured and the other of which comprises a separate mounting lug with a slot for receiving a downwardly extending shank forming a continuation of a web between parallel clamping jaws to which the arm is secured. Integral with the clamping member is a mounting lug cooperating with the separable mounting lug to support the bracket on a hinge pin associated with either an adapter or door hinge. The shank receiving slot of the separable mounting lug is so formed with respect to the mounting lug and shank, preferably by slightly bending the mounting lug between the mounting aperture and slot therein, that tightening of the separable mounting lug against a hinge member has the effect of canting the slot with respect to the shank and tightly wedging the shank in position. The bracket members may be formed from sheet metal having substantially greater thickness, and, therefore, greater strength, than sheet metal from which adjustable mounting brackets have heretofore been produced so that greatly increased strength, without increase in weight, is obtained. Additionally, a set screw threaded through the web to fix the position thereof with respect to the portion of the hinge attached to the door has a thicker section in which to be supported. Thus, when the angular position of the bracket has been established, the set screw may be tightly turned home to maintain the desired adjustment without possibility of stripping the threads in the web portion of the bracket. The greatly increased strength referred to hereinabove is actually obtained in a structure which affords a saving in metal and is lighter than commercial brackets heretofore employed for the same purpose.

Other objects and features of the invention will appear from the following detailed description taken with the accompanying drawings wherein—

Fig. 1 is a fragmentary perspective view of the front portion of a truck with the bracket of my invention mounted in position on a hinge thereof;

Fig. 2 is an enlarged fragmentary perspective view of the adjustable bracket with a portion of a door hinge associated therewith;

Fig. 3 is a vertical sectional view taken on the line 3—3 of Fig. 2 looking in the direction of the arrows; but showing a portion of the complete hinge in elevation to illustrate the manner of mounting the bracket thereto;

Fig. 4 shows the bracket without the adjustable arm mounted to an adapter and in the general form in which it is offered for sale;

Fig. 5 is a transverse sectional view taken on the line 5—5 of Fig. 4; and

Fig. 6 is a fragmentary sectional view illustrating the position of the separable mounting lug before it has been tightened in position against a lower portion of the door hinge.

In Fig. 1, I illustrate a conventional manner of employing an adjustable bracket of the type herein disclosed in which a truck 10 is provided with a door 11 on a hinge of which the bracket is carried. The bracket, indicated generally by the reference character 12, carries an adjustable arm consisting of a sleeve 13 and telescoping rod 14 held in adjusted position by a set screw 16. A mirror supporting frame 17 is carried on the free end of the rod 14 suitably through a universal joint (not shown). The bracket 12 is adjustable to fit hinges of different length or may be attached to an adapter in the manner referred to hereinbelow. The adjustable bracket comprises a clamping member 18 and separable mounting lug 19. The clamping member has a web 21, clamping jaws 22 between which a pivot lug 23 on the free end of the sleeve 13 is clamped, an intermediate mounting lug 24 and a depending shank 26. Shank 26 comprises an extension of the web 21 preferably with a portion of the material at the sides of the web retained to produce a channel as clearly shown in Figs. 2 and 4.

The shank 26 extends into a slot 27 in the separable mounting lug 19 and both the integral mounting lug 24 and separable mounting lug 19 are provided with apertures to receive a bolt 28, with a nut 29 threaded to the lower end thereof. The separable mounting lug 19 is bent slightly as shown in Figs. 3 and 6 so that the plane in which the slot 27 is formed is at an angle to the plane in which the bolt receiving aperture is formed.

One conventional way of attaching the adjustable bracket on a truck or other vehicle is by means of an adapter 31 having screw holes 32 at top and bottom thereof for attachment to a suitable portion of the body or frame and with a drawn section 33 formed away from the attaching sections and shaped to receive the bolt 28. The web 21 has a set screw 34 which can be turned in to cause its end to engage the portion 33 of the adapter and to hold the bracket in the angular position to which it has been adusted. The adjustable bracket of my invention may suitably be furnished to the trade with an adapter, as shown in Fig. 4, and also in most instances with the adjustable arm, mirror frame and mirror all ready for attachment to the vehicle. When the unit is installed, the adapter may be used or the adapter may be discarded and the adjustable bracket mounted directly on a hinge.

In the drawings I show a portion of a hinge comprising the parts 36 and 37, the former being attached to the door and the latter to the body. When the bracket is secured to the hinge, the regular hinge pin is discarded, the mounting lugs placed in position above and below the hinge with the shank 26 extending into the slot 27, the bolt 28 inserted through the two hinge sections and through the mounting lugs and the nut 29 drawn up loosely. When the adjustment of the bracket has been determined, the nut 29 is drawn up tightly and the set screw 34 screwed in until it engages the portion 36 of the hinge. Thus, when the door is opened its hinge section, the clamping bracket and all parts of the mirror support move as a unit and the adjustment of the mirror is maintained with no possibility of displacement.

Those skilled in the art will understand that by means of my invention the same adjustable bracket may be mounted on hinges having a vertical dimension all the way from the smallest to the largest encountered in commercial vehicles, and, regardless of the size of hinge, dependable results are assured. The shank 26 may be made quite long without appreciably adding to the weight but more than adequate strength is assured. When the separable mounting lug 19 is being adjusted to position, the shank 26 will move freely through the slot 27 because the plane of this slot may be brought to a position as shown in Fig. 6; but when the nut 29 is tightened there is a resulting canting action of the slot, so that the effective width thereof with respect to the shank 26 is less and the shank is wedged firmly in the vertically narrowed slot. The axes of the slot and bolt receiving aperture are non-parallel, a condition readily established as seen by merely bending the otherwise flat member comprising the separable mounting lug.

Notwithstanding the great advantages possessed by the bracket of my invention, it is relatively inexpensive to manufacture, both from the standpoint of materials involved and operations required. The overall weight is less than in prior brackets so that, from a cost standpoint, less material is needed. The set screw 34 can readily be placed in any position to engage the proper hinge section, and, because of the simplicity of the clamping member, more than one tapped hole may be provided so that the position of the set screw may be changed to suit the relative dimensions of different types of hinges.

What I claim as new and desire to protect by Letters Patent of the United States is:

1. An adjustable bracket for a rear view mirror, comprising a clamping member having a web portion, two generally parallel clamping jaws, an apertured mounting lug and a shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes.

2. An adjustable bracket for a rear view mirror, comprising a clamping member having a web portion, two generally parallel clamping jaws, an apertured mounting lug and a shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, said web portion carrying a set screw positioned to engage a portion of a hinge associated with a door.

3. An adjustable bracket for a rear view mirror, comprising a clamping member having a web portion, two generally parallel clamping jaws, an apertured mounting lug and a channel shaped shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes.

4. An adjustable bracket for a rear view mirror, comprising a clamping member having a web portion, two generally parallel clamping jaws, an apertured mounting lug and a shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, said separable mounting lug having its said slot so formed with respect to such mounting lug and shank that tightening of such mounting lug against a hinge member has the effect of wedging said shank tightly in said slot.

5. An adjustable bracket for a rear view mirror, comprising a clamping member having a web portion, a set screw extending through said web portion, two generally parallel clamping jaws at right angles to the web, an apertured mounting lug at right angles to said web portion and clamping jaws and a channel shaped shank depending from said web portion, and a separable mounting lug with a slot for receiving said shank in adjustable relation, both said mounting lugs being apertured to receive a fastening bolt, said mounting lugs being thereby mutually adjustable for atachment of the mounting bracket to hinges of different sizes, said separable mounting lug having its said slot so formed with respect to such mounting lug and shank that tightening of such mounting lug against a hinge member has the effect of wedging said shank tightly in said slot.

6. An adjustable bracket for a rear view mirrow, comprising a clamping member having a web portion, two generally parallel clamping jaws, an apertured mounting lug and a shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, the slot and aperture of said separable mounting lug having non-parallel axes, so that tightening of said separable lug against a hinge member has the effect of tightening the engagement between the said lug and said shank.

7. An adjustable bracket for a rear view mirror, comprising a clamping member having a web portion, two generally parallel clamping jaws, an apertured mounting lug and a shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, said separable mounting lug being generally flat except for a slight bend between said aperture and slot, so that tightening of the said lug against a hinge member will tighten the engagement between said lug and bracket shank.

8. An adjustable bracket for a rear view mirror, comprising a clamping member having a web portion, a set screw extending through said web portion, two generally parallel clamping jaws at right angles to said web portion, an apertured mounting lug at right angles to said web portion and clamping jaws and a channel shaped shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, said separable mounting lug being generally flat except for a slight bend between said aperture and slot, so that tightening of the said lug against a hinge member will tighten the engagement between said lug and bracket shank.

9. An adjustable bracket for a rear view mirror, comprising a clamping member having a web portion, a set screw extending through said web portion, two generally parallel clamping jaws at right angles to said web portion, an apertured mounting lug at right angles to said web portion and clamping jaws and a channel shaped shank depending from said web portion, and a separable mounting lug with a slot for receiving said shank in adjustable relation, both said mounting lugs being apertured to receive a fastening bolt, said mounting lugs being thereby mutually adjustable for attachment of the mounting bracket to hinges of different sizes, the slot and aperture of said separable mounting lug having non-parallel axes, so that tightening of said separable lug against a hinge member has the effect of tightening the engagement between the said lug and said shank.

WILLIAM P. TOLBERT.